United States Patent
Rateick, Jr. et al.

(10) Patent No.: US 7,025,182 B2
(45) Date of Patent: *Apr. 11, 2006

(54) SELECTIVELY COLD WORKED HYDRAULIC MOTOR/PUMP SHOE

(75) Inventors: Richard G. Rateick, Jr., South Bend, IN (US); Larry A. Portolese, Granger, IN (US)

(73) Assignee: Honeywell International Inc., Morris Township, NJ (US)

( * ) Notice: Subject to any disclaimer, the term of this patent is extended or adjusted under 35 U.S.C. 154(b) by 19 days.

This patent is subject to a terminal disclaimer.

(21) Appl. No.: 10/910,320

(22) Filed: Aug. 4, 2004

(65) Prior Publication Data

US 2005/0016801 A1    Jan. 27, 2005

Related U.S. Application Data

(62) Division of application No. 09/896,261, filed on Jun. 29, 2001, now Pat. No. 6,802,916.

(51) Int. Cl.
*F16D 65/04* (2006.01)

(52) U.S. Cl. .............. 188/250 G; 188/250 B; 148/674; 29/511; 29/557

(58) Field of Classification Search ........... 148/674; 29/557, 558, 888, 509, 510, 511; 72/356, 72/377, 340, 341; 470/29; 188/1.11 R, 188/250 G, 250 B See application file for complete search history.

(56) References Cited

U.S. PATENT DOCUMENTS

| | | |
|---|---|---|
| 3,787,128 A | 1/1974 | Maistrelli |
| 3,788,779 A | 1/1974 | Carlson |

(Continued)

FOREIGN PATENT DOCUMENTS

| | | |
|---|---|---|
| DE | 196 52 326 C1 | 12/1997 |
| JP | 56-084468 A | 7/1981 |

OTHER PUBLICATIONS

"Cold Heading," from ASM Metals Handbook vol. 14: Forming and Forging, Apr. 1988, pub. by ASM International, 9th edition, pp. 291-298.

(Continued)

*Primary Examiner*—Matthew C. Graham
(74) *Attorney, Agent, or Firm*—Birch, Stewart, Kolasch, & Birch, LLP

(57) ABSTRACT

A method of manufacturing a wear resistant shoe (26) includes upsetting (46) one end portion (38) of cylindrical member to work harden that portion to a substantial depth, machining (48) the cylindrical member portion to finished dimensions and surface hardening (56) a face (28 or 34) of the machined cylindrical member portion. The cylindrical member may comprise rod stock of a diameter less than the greatest diameter of the finished shoe and be upset or swaged to axially reduce and radially increase the dimensions of the one end portion. A hollow region (30) is formed in an opposite rod stock end portion and the periphery (50) of the hollow region is crimped about a rounded end (18) of the piston (20). The cold work done during the swaging or forming process provides a foundation for hardened faces comprising balance (28) and auxiliary balance (34) lands, forms a crude shape of the shoe, and imparts work hardening and wear property improvements. The harder metal surface provides a foundation for subsequent surface hardening such as coating with TiN. The crimping process used to join the shoe to the piston imparts cold work to the skirt region of the shoe and enhances the wear resistance of the shoe. The cold heading step (46) may be omitted if a hardened rod stock is used, but the skirt should be annealed (66) prior to crimping to the piston.

23 Claims, 3 Drawing Sheets

U.S. PATENT DOCUMENTS

| | | |
|---|---|---|
| 3,890,106 A | 6/1975 | Miller |
| 3,978,772 A | 9/1976 | Miyao et al. |
| 4,003,765 A | 1/1977 | Davidson |
| 4,138,775 A | 2/1979 | Takaoka et al. |
| 5,076,089 A | 12/1991 | Takami |
| 5,728,475 A | 3/1998 | Rateick, Jr. |
| 5,950,480 A | 9/1999 | Fukushima |
| 6,802,916 B1 * | 10/2004 | Rateick et al. ............ 148/674 |

OTHER PUBLICATIONS

"Nickel, Cobalt, and Their Alloys," ASM Specialty Handbook, Dec. 2000, pub. by ASM International, pp. 376, 377, 384, 385, and 401-406.

* cited by examiner

SELECTIVELY COLD WORKED HYDRAULIC MOTOR/PUMP SHOE

This application is a Divisional of application Ser. No. 09/896,261, filed on Jun. 29, 2001 U.S. Pat. No. 6,802,916, and for which priority is claimed under 35 U.S.C. § 120, the entire contents of which is hereby incorporated by reference.

BACKGROUND OF THE INVENTION

1. Field of the Invention

The present invention relates to a process of making a wear resistant shoe of the type frequently employed to engage a swash-plate or moving cam surface in a pump or similar device, and the product resulting from that process.

2. Description of the Related Art

It is a fairly common practice to harden machinery parts that are subject to substantial wear. For example, pumps (and analogous motors) sometimes employ a plurality of pistons that are sequentially actuated by a off-axis rotating cam surface called a swash plate. Each piston has a shoe which is fixed to the piston by a ball and socket joint and has wear resistant face which engages the swash plate. U.S. Pat. No. 5,728,475 illustrates a technique for hardening the wear surfaces of a shoe suitable for use in such a pump, motor or similar environment which is compatible with aircraft fuel.

In this patented arrangement, the shoe is machined to a nearly final shape and then coated to provide a surface hardening. Thereafter, a skirt portion of the surface hardened shoe is annealed so that the skirt may be crimp attached to a rounded portion of the piston to form the ball and socket joint. This technique has met with good success, however, for more demanding applications, an improved wear couple may be required. In some applications, the boride surface hardening coating tended to crack, apparently because the hard thin boride coating was insufficiently supported by the soft basis metal. In addition, some operating conditions caused wear-through of the coating. The need to crimp the shoe to the piston head precludes the use of starting stock in the cold-reduced condition. The decreased ductility in this condition would result in greater chance of cracking during crimping.

It is desirable to prevent cracking of the surface hardening and to increase the wear resistant properties of such a shoe.

SUMMARY OF THE INVENTION

The present invention provides a shoe with a work hardened foundation, a surface hardened face and a work hardened skirt forming the socket of the ball and socket joint. A cold heading process of cold working to form the cam engaging surfaces and a crimping process of cold working to join the piston and shoe are performed as separate process steps. If the entire cylinder blank from which the shoe is formed were cold worked, the crimping process would be difficult or impossible to perform without cracking. This process differs from U.S. Pat. No. 5,728,457 in that the hardening of the cam engaging surfaces (a balance land and back flange) is achieved by cold heading as opposed to a thermal diffusion boriding.

In general, and in one form of the invention, a wear resistant shoe is made by cold-heading one end portion of a generally cylindrical blank to radially increase and axially diminish the dimensions of the one end portion, and to work harden the one end portion while leaving an opposite end portion dimensionally unchanged. Subsequent cold-working and hardening of the opposite end portion is achieved while joining the shoe and piston during crimping of the skirt about a received piston rounded end. A hollow skirt is machined in the dimensionally unchanged portion prior to the subsequent cold-working.

Also in general, a wear resistant shoe is formed from hardened rod stock and assembled to a piston by first annealing one end portion of the machined rod stock and then forming a hollow region in the annealed rod stock end portion. Subsequent crimping of the periphery of the hollow region about a rounded end of the piston rehardens the annealed end.

An advantage of the present invention is that a hardened region provides support for a surface hardened face to reducing fracturing of the surface hardened face. No Laves phase precipitation occurs; thus no post hardening thermal treatment is required. Cold heading of the shoe through hardens, as opposed to case hardening the upset material, thus simplifying grinding and lapping of the balance land and auxiliary balance lands. Wear resistance of the auxiliary balance land increases. A subsequent surface hardening, for example, a 2 micron thick titanium nitride coating, remains intact after testing under conditions that historically wore through the 25 micron thick boride coating and into the basis metal. Masking operations can be performed more simply by mechanical arrangements as opposed to the chemical means employed in former process. The harder substrate provides a superior base on which to support the wear resistant coating.

BRIEF DESCRIPTION OF THE DRAWINGS

Corresponding reference characters indicate corresponding parts throughout the several drawing views.

DETAILED DESCRIPTION OF THE INVENTION

Figure 1:
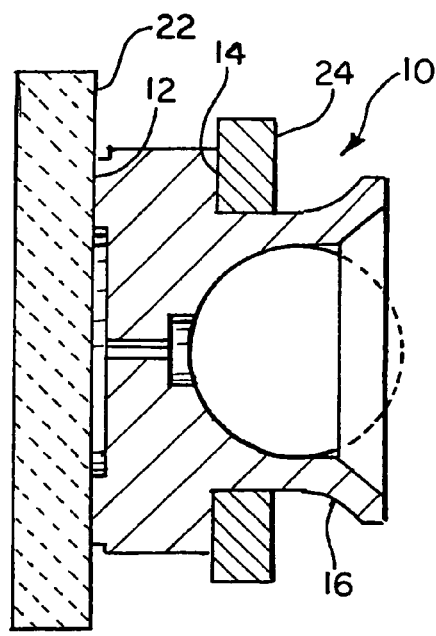
FIG. 1 is a cross-sectional view of a prior art shoe and shoe engaging cam surfaces.
Figure 2:
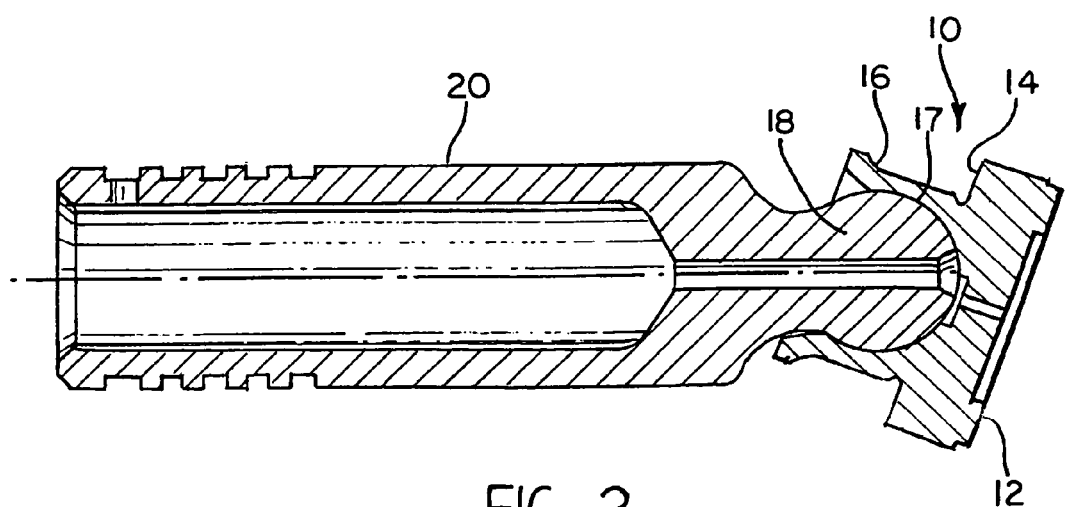
FIG. 2 is a cross-sectional view of the prior art shoe of FIG. 1 crimped about the rounded end of a piston rod.

Referring now to the drawings and particularly to FIGS. 1 and 2, there is shown a piston shoe 10 of an axial piston pump or motor. FIG. 1 shows the piston skirt portion 16 or flange open to receive the rounded end of piston 20, while FIG. 2 shows that portion crimped about the annular or rounded piston head 18. The shoe 10 has a flat shoe wear surface 12 that contacts a cam plate 22. A back flange 14 of the shoe 10 also wears against an auxiliary cam plate 24. In order for the piston shoe 10 to operate within a fuel environment, the piston shoe 10 must be corrosion resistant, compatible with fuel, and provide the desired wear resistance. The piston shoe 10 is made of a cold workable cobalt based alloy which is compatible with fuel and provides corrosion resistance. The wear surface 12 which bears against the cam plate 22 and the back flange 14 which bears against the auxiliary cam plate 24 are provided with a thermal diffusion boride treatment which provides the desired wear resistance. In order to restore sufficient ductility to flange 16 of the shoe 10 that will be cold worked, a solution treatment is performed to anneal that region at a temperature range of 2050.degree. to 2250.degree. F. in a non-oxidizing environment. The wear surface 12 and back flange 14 are maintained at a cooler temperature by engagement of the shoe 10 with a heat sink such as a copper part, so that the coated surfaces do not lose their coating. The flange area 16 of the shoe 10 is then cold worked by crimping in order to form the material to the round shape of the piston head 18. The shoe 10 and piston 20 of FIGS. 1 and 2 are substantially as described in the abovementioned U.S. Pat. No. 5,728,475.

Figure 3:
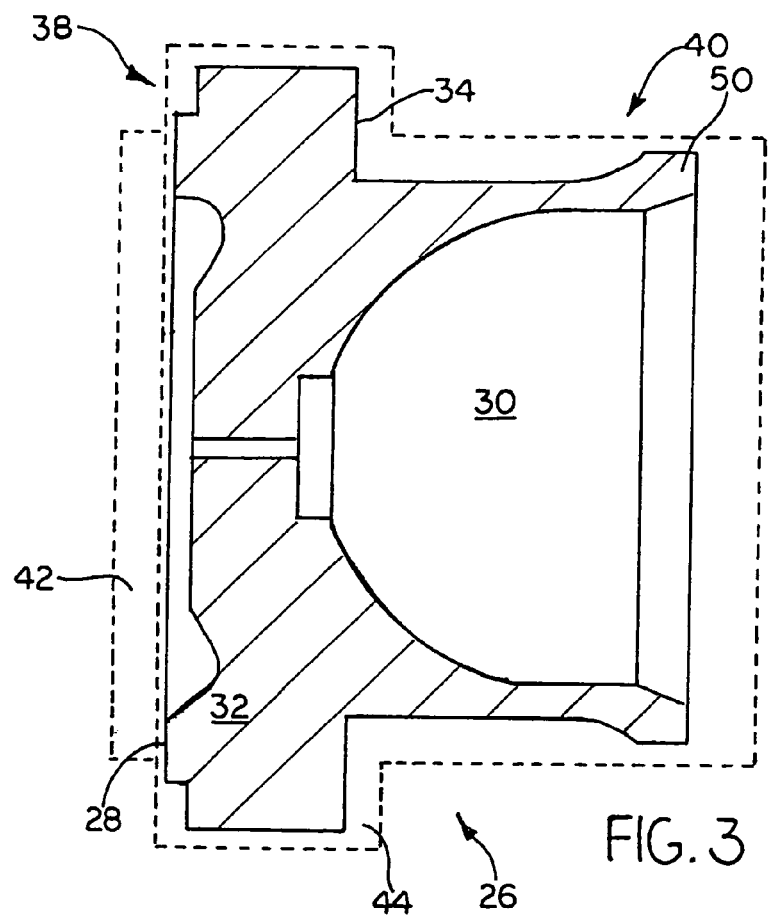
FIG. 3 is a cross-sectional view of an improved shoe made according to the present invention.

In FIG. 3, a wear resistant shoe 26 which may be used in place of the shoe 10 of FIGS. 1 and 2 has a surface hardened flat annular balance land or face 28 for engaging a cam plate, a socket 30 for providing a pivotal coupling to a piston, and a work hardened foundation 32 in the face region for providing rigid support for the surface hardened face 34. Haynes 25 (AMS 5759) was originally selected for fuel motor and pump shoes on the basis of its cold workability, corrosion resistance and wear resistance and was used in the solution annealed bar form. The process of crimping the shoe 26 to the piston gave rise to work hardening in the crimped region. This work hardening together with the inherent wear resistance of the Co based alloy gave rise to the requisite wear resistance at the piston to shoe interface.

Figure 4:
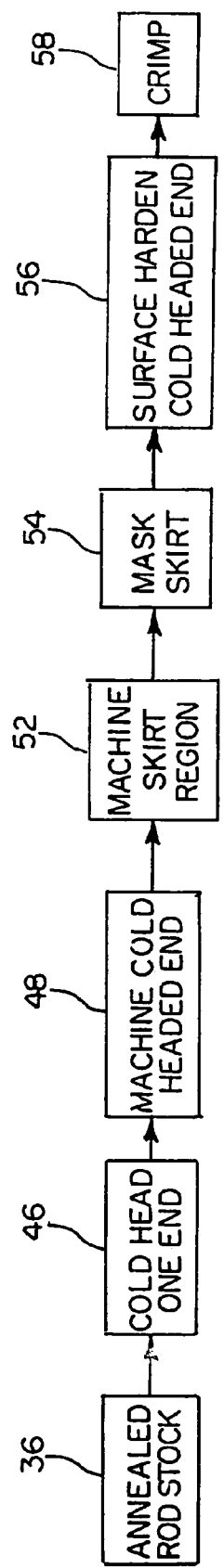
FIG. 4 is a flow chart illustrating a process for making the shoe of FIG. 3.

Comparing FIGS. 3 and 4, the annealed rod stock 36 from which the shoe is to be formed is shown in dotted lines and has two end portions 38 and 40. End 38 is upset or cold-headed as indicated at 46 to radially increase and axially diminish the dimensions of the one end portion. The cold-heading also serves to work harden the one end portion while the opposite end portion 40 is dimensionally unchanged and remains in an unhardened state. Later end 40 will be cold-worked and hardened as indicated at 58. The cold-headed blank is machined as indicated at 48 and 52 to form the final cross-hatched shape and final dimensions prior to the cold-working 58 to form a hollow skirt region 30 defined by the skirt or flange 50 in end portion 40 for receiving a rounded end 18 of a piston 20, and to form the cam engaging wear resistant surfaces 28 and 34. The skirt 50 should remain unhardened until it is hardened by crimping 58, however, enhanced hardness of the cam engaging surfaces 28 and 34 may be achieved by masking the skirt region as at 54 and surface hardening 56 the machined cam engaging surfaces, for example, by application of a TiN material to a thickness of approximately 2 micron. Later, the crimping 58 imparts an increased hardness to the cylindrical member close to the crimp.

Prior to cold heading, the soft rod stock is a cylindrical blank of an alloy of cobalt as shown by the FIG. 3 outline surrounding the right hand portion 40 and the extended region 42 enclosed in the dotted lines. The rod stock has a diameter less than the greatest diameter of the finished shoe. Cold heading compresses the material axially and displaces the material in region 42 radially outwardly to form the work hardened foundation regions 32 and the peripherally outer portions of the hardened faces 28 and 34. Process step 46 indicates this work hardening of portion 38 of the cylindrical member to a substantial depth. Machining steps 48 and 52 remove excess material such as at 44 and create a shoe of finished dimensions as indicated by the cross-hatched region of FIG. 3 ready for masking and surface hardening of faces 28 and 34 of the machined cylindrical member portion as indicated at 56.

To summarize FIGS. 3 and 4, the starting basis metal in the annealed condition 36 with hardness generally less than 30 HRC is a right circular cylinder of single diameter greater than or equal to the non-crimped shoe skirt 50 diameter. This material is cold headed at 46 to form a blank as shown in FIG. 3. The larger diameter portion 38 is upset by the cold head die by an amount sufficient to provide the desired hardening. The upset ratio (the amount of axial reduction divided by the original axial length of the portion to be upset) is generally in the range of 20–40%, with the higher amount preferred. The upset portion comprises the material making up the balance land 28 and the back flange 34. This upset portion comprises the material making up the balance land 28 and the back flange 34. The non-upset portion 40 comprises the non-cold worked material making up the skirt 50. The skirt is thus in a soft condition that can be crimped at 58 without cracking. After cold heading 46, the final shoe geometry is machined from the blank. The balance land 28 and back flange 34 may subsequently be thermal diffusion borided and/or titanium nitride coated at 56 to further enhance the wear resistance. The shoe is then crimped at 58 onto the piston head, imparting cold work and wear resistance to the shoe skirt.

Figure 5:
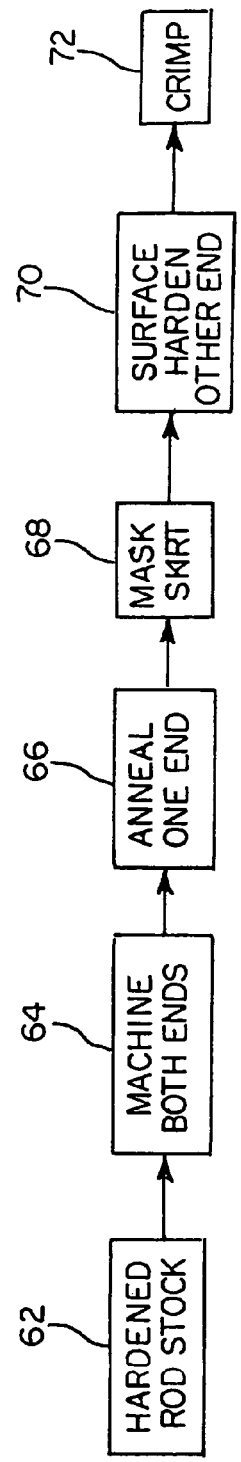
FIG. 5 is a flow chart illustrating an alternative process for making the shoe of FIG. 3.

FIG. 5 illustrates a modification of the process where substantially the same shoe 26 is made starting with hardened rod stock 62. End 40 is annealed at 66 and remains in a soft condition until work hardening during the crimping step 72. The machining of both ends to the finished dimensions including forming the hollow region 30 in the annealed rod stock end portion and machining the opposite end portion to form the cam engaging wear resistant surfaces is accomplished at 64. Note, the rod stock 62 must be of a diameter greater than or equal to the greatest diameter of the finished shoe since no cold-heading and radial enhancement occurs. Once machined, the skirt is masked at 68 to prevent surface hardening and the wear surfaces 28 and 34 are surface hardened as before.

In both FIGS. 4 and 5, the basis metal is Haynes 25 or L-605 (Co-1ONi-2 OCr-15W-3Fe-0.1C-1 Si-1.5Mg-0.03P-0.02S). In FIG. 5, the starting basis metal 62 is in the cold worked condition, with a hardness sufficient to provide the wear resistance or coating support desired. The shoe 26 is machined from this work hardened material. The shoe is subsequently annealed at 66, for example, by placing it onto a copper heat sink of a type shown in the abovementioned U.S. Pat. No. 5,728,475. In the patent, such an arrangement is used to dissolve precipitates deriving from a surface hardening coating, while here softening to a substantial depth is accomplished. A single induction coil may wrapped around the skirt and the skirt subsequently solution annealed by heating to 2150 deg. F. to 2250 deg. F. for 10 minutes in the case of a typical shoe. This anneals out the cold work in the skirt region making it possible to crimp the shoe to the piston without cracking. Longer times may be required for larger parts. The material comprising the back flange and the balance land is maintained by the heat sink at a temperature below 2150 deg. F. such that the cold work is retained. The balance land and back flange may subsequently be thermal diffusion borided and or titanium nitride coated to further enhance the wear resistance. The shoe is then crimped onto the piston head, imparting cold work and wear resistance to the shoe skirt.

Figure 6:
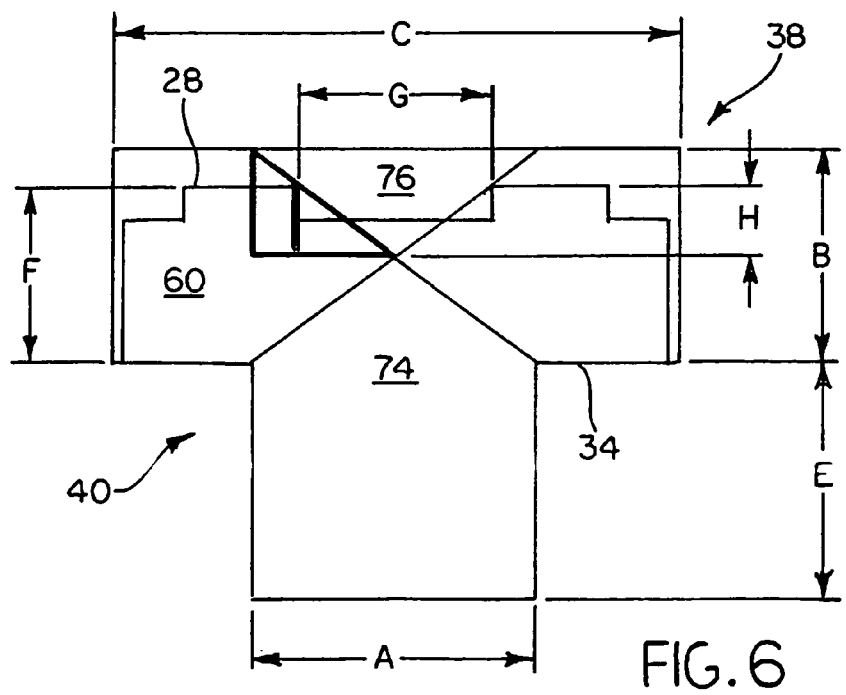
FIG. 6 is a view of the blank from which the shoe of FIG. 3 may be formed illustrating the deformation and resulting hardening thereof.

FIG. 6 illustrates the variations in hardness imparted by the cold-heading process 46. Material spills downwardly and outwardly so that the region 60 is substantially work hardened. However, material in the conical regions 74 and 76 may, under some circumstances, receive little cold-working and remain unhardened. These conical regions constitute "dead zones" and zone 76 should be excluded from the finished balance land region. Also, zone 74 should not spill radially outwardly into the region of the auxiliary balance land 34. The starting dimensions of the cylindrical blank should be selected to insure work hardening of the annular wear surface 28 and the foundation thereunder, as well as the surface 34. If L is the length of the original blank, the original cylindrical volume and post cold-heading volumes may be equated and solved to obtain $L=(A^2E+C^2B)/A^2$.

The upset U is the ratio of the height change to the initial height: $U=(L-E-B)/(L-E)$. From the similar triangles illustrated in FIG. 6, the height B of the headed portion 38 of the shoe prior to machining is $B=F/(G/2A+\frac{1}{2})$. For a selected upset ratio, these three equations may be solved simultaneously to determine L, U and B. This somewhat idealized analysis assumes the apexes of the dead zones are coincident and other simplifying assumptions. Also some allowances for machining material should be introduced. The results should be confirmed by experimentation with an actual shoe design.

In one example, the approximate hardness at the balance land 28 was 44 HRC and in the back flange 34, 45 HRC. The hardness at the apex of the shoe socket was 43 HRC. The hardness decreased to 36 HRC and finally 35 HRC at the midpoint and tip of the skirt respectively prior to crimping to a piston.

What is claimed is:

1. A wear resistant shoe comprising: a cam engaging portion on one end for engaging with a cam element; and a piston engaging portion on another end for engaging said wear resistant shoe to a piston element, said wear resistant shoe having been manufactured in accordance with a method comprising:
   cold-heading one end portion of a generally cylindrical blank to radially increase and axially diminish the dimensions of the one end portion, and to work harden the one end portion while leaving an opposite end portion dimensionally unchanged and maintaining cold-workability of the opposite end portion;
   machining the previously cold-headed one end portion to form said cam engaging portion of said wear resistant shoe; and
   subsequently cold-working and thereby hardening the opposite end portion, which forms said piston engaging portion.

2. The wear resistant shoe of claim 1, wherein said manufacturing method includes the additional step of:
   machining the cold-headed blank prior to cold-working to form a hollow skirt in said opposite end portion for receiving a rounded end of a piston rod.

3. The wear resistant shoe of claim 2, wherein the step of cold-working comprises crimping the skirt about a received piston rounded end, joining the shoe and piston, and work hardening the skirt.

4. The wear resistant shoe of claim 3, wherein the step of machining the one end portion machines the one end portion to predetermined final dimensions subsequent to the step of cold-heading and prior to the step of crimping.

5. The wear resistant shoe of claim 3, wherein the step of machining the cold-headed end portion forms a cam engaging wear resistant surface.

6. The wear resistant shoe of claim 5, wherein the manufacturing method further includes the step of surface hardening the machined cam engaging surface.

7. The wear resistant shoe of claim 6, wherein the step of surface hardening comprises application of a TiN material.

8. The wear resistant shoe of claim 1, wherein the cylindrical blank comprises an alloy of cobalt.

9. The wear resistant shoe of claim 8, wherein said alloy of cobalt is non-corrosive in aircraft fuel.

10. The wear resistant shoe of claim 9, wherein said alloy of cobalt has corrosion resistance, wear resistance, and cold workability properties consistent with Haynes 25.

11. The wear resistant shoe of claim 10, wherein said alloy of cobalt is Haynes 25.

12. A wear resistant shoe comprising: a cam engaging portion on one end for engaging with a cam element; and a piston engaging portion on another end for engaging said wear resistant shoe to a piston element, said wear resistant shoe having been manufactured in accordance with a method comprising:
   work hardening a portion of a cylindrical member to a substantial depth while leaving another portion of the cylindrical member dimensionally unchanged and maintaining cold-workability of said another portion;
   machining the work-hardened cylindrical member portion to finished dimensions, thereby forming the cam engaging portion of said wear resistant shoe; and
   surface hardening a face of the machined cylindrical member portion.

13. The wear resistant shoe of claim 12, wherein said manufacturing method includes the additional step of machining said another portion of the cylindrical member to form a hollow skirt in said another portion for receiving a rounded end of a piston rod.

14. The wear resistant shoe of claim 13, wherein said manufacturing method includes the further step of crimping the hollow skirt about the rounded end, the crimping imparting an increased hardness to the cylindrical member close to the crimp.

15. A wear resistant shoe having a surface hardened face for engaging a cam, a socket for providing a pivotal coupling to a piston rod, and a work hardened foundation in the face region for providing rigid support for the surface hardened face, said wear resistant shoe having been manufactured in accordance with a method comprising:
   cold-heading one end portion of a generally cylindrical blank to radially increase and axially diminish the dimensions of the one end portion, and to work harden the one end portion while leaving an opposite end portion dimensionally unchanged and maintaining cold-workability of the opposite end portion;
   machining the previously cold-headed one end portion to form a cam engaging portion of said wear resistant shoe; and
   subsequently cold-working and thereby hardening the opposite end portion, which forms a piston engaging portion that includes said socket.

16. The wear resistant shoe of claim 15, wherein the socket is crimped around a rounded portion of a piston and work hardened by the crimping.

17. A wear resistant shoe comprising: a cam engaging portion on one end for engaging with a cam element; and a piston engaging portion on another end for engaging said wear resistant shoe to a piston, the shoe being formed from rod stock of a diameter less than the greatest diameter of the finished shoe in accordance with a manufacturing method comprising:
   upsetting one end portion of the rod stock to axially reduce and radially increase the dimensions of the one end portion, and to work harden the one end portion while leaving an opposite end portion dimensionally unchanged and maintaining cold-workability of the opposite end portion;

machining the previously upset one end portion to form the cam engaging portion of said wear resistant shoe;

forming a hollow region in an opposite rod stock end portion, thereby forming the piston engaging portion; and crimping the periphery of the hollow region about a rounded end of the piston rod.

18. The wear resistant shoe of claim 17, wherein said manufacturing method further comprises the step of work hardening the one end portion during the upsetting step.

19. The wear resistant shoe of claim 18, wherein said manufacturing method further comprises the step of surface hardening the upset one end.

20. The wear resistant shoe of claim 17, wherein said manufacturing method further comprises the step of work hardening the periphery of the hollow region during the step of crimping.

21. A wear resistant shoe comprising: a cam engaging portion on one end for engaging with a cam element; and a piston engaging portion on another end for engaging said wear resistant shoe to a piston, the shoe being formed from hardened rod stock in accordance with a manufacturing method comprising:

machining a region of the hardened rod stock to form a cam engaging wear resistant surface of the wear resistant shoe;

forming a hollow region in one rod stock end portion;

annealing the one end portion of the rod stock; and crimping the periphery of the hollow region about a rounded end of the piston rod.

22. The wear resistant shoe of claim 21, wherein said manufacturing method further includes the step of surface hardening the machined cam engaging surface.

23. The wear resistant shoe of claim 21, wherein the step of crimping work hardens the one end portion.

* * * * *